US010357729B2

(12) United States Patent
Parker

(10) Patent No.: US 10,357,729 B2
(45) Date of Patent: Jul. 23, 2019

(54) HIGH EFFICIENCY AND HIGH CAPACITY GLASS-FREE FUEL FILTRATION MEDIA AND FUEL FILTERS AND METHODS EMPLOYING THE SAME

(71) Applicant: AHLSTROM-MUNKSJÖ OYJ, Helsinki (FI)

(72) Inventor: Ina Parker, Mount Juliet, TN (US)

(73) Assignee: AHLSTROM-MUNKSJÖ OYJ, Helsinki (FI)

( * ) Notice: Subject to any disclaimer, the term of this patent is extended or adjusted under 35 U.S.C. 154(b) by 8 days.

(21) Appl. No.: 15/493,683

(22) Filed: Apr. 21, 2017

(65) Prior Publication Data
US 2017/0296953 A1 Oct. 19, 2017

Related U.S. Application Data

(63) Continuation-in-part of application No. 13/417,022, filed on Mar. 9, 2012, now Pat. No. 9,662,600.

(51) Int. Cl.
*B01D 39/18* (2006.01)
*B01D 39/16* (2006.01)

(52) U.S. Cl.
CPC ......... *B01D 39/1623* (2013.01); *B01D 39/18* (2013.01); *B01D 2239/064* (2013.01);
(Continued)

(58) Field of Classification Search
CPC ................ B01D 39/1623; B01D 39/18; B01D 2239/1291; B01D 2239/1225;
(Continued)

(56) References Cited

U.S. PATENT DOCUMENTS 4,089,783 A * 5/1978 Holyoak ............... B01D 29/111
210/358
4,973,382 A * 11/1990 Kinn .................. B01D 39/1623
162/146
(Continued)

FOREIGN PATENT DOCUMENTS

WO WO 2008/039377 4/2008

OTHER PUBLICATIONS

Carrillo et al, "Structural Characterization and Properties of Lyocell Fibers After Fibrillation and Enzymatic Defibrillation Finishing Treatments", *Textile Res. J.* 73(11), 1024-1030 (2003).
(Continued)

*Primary Examiner* — Madeline Gonzalez
(74) *Attorney, Agent, or Firm* — Nixon & Vanderhye P.C.

(57) ABSTRACT

High efficiency and high capacity glass-free filtration media include a blend of synthetic non-fibrillated staple fibers and fibrillated cellulosic staple fibers, wherein the fibrillated cellulosic fibers are present in the media in an amount to achieve a multipass dust holding capacity of 10 mg/in$^2$ and greater, and a multipass filtration efficiency at 1.5 microns of greater than 50%. The filtration media is made by forming a wet laid sheet from a fibrous slurry blend of the synthetic non-fibrillated staple fibers and fibrillated cellulosic staple fibers, followed by drying the sheet to obtain the filtration media. Optionally, the filtration media may be provided with a resin binder and may be grooved and/or pleated.

30 Claims, 4 Drawing Sheets

(52) U.S. Cl.
CPC .......... *B01D 2239/086* (2013.01); *B01D 2239/1225* (2013.01); *B01D 2239/1233* (2013.01); *B01D 2239/1291* (2013.01)

(58) Field of Classification Search
CPC ...... B01D 2239/1233; B01D 2239/064; B01D 2239/086
USPC .......... 210/490, 504, 489, 505, 493.5, 491, 210/493.1, 508, 500.29, 496; 977/700, 977/902
See application file for complete search history.

(56) References Cited

U.S. PATENT DOCUMENTS

| | | |
|---|---|---|
| 6,419,839 B1 | 7/2002 | Cox |
| 7,144,533 B2 | 12/2006 | Koslow |
| 7,655,112 B2 | 2/2010 | Koslow |
| 2008/0311815 A1 | 12/2008 | Gupta et al. |
| 2012/0175298 A1 | 7/2012 | Gupta |

OTHER PUBLICATIONS

Wang et al, "Preparation Ultra-fine Fibrillated Lyocell Fiber and Its Application in Battery Separator", *Int. J. Electrochem. Sci.*, 6 (2011) 4999-5004.

Herbert Sixta, "Postgraduate course on Cellulose Chemistry Lyocell Fibers", Jun. 21-22, 2016.

"EFTec Nanofibrillated Fiers", Engineered Fibers Technology, (http:www.eftfibers.com/prod_eftec.php), copyrighted 2010.

* cited by examiner

HIGH EFFICIENCY AND HIGH CAPACITY GLASS-FREE FUEL FILTRATION MEDIA AND FUEL FILTERS AND METHODS EMPLOYING THE SAME

CROSS-REFERENCE TO RELATED APPLICATIONS

This application is a continuation-in-part (CIP) of copending commonly owned U.S. application Ser. No. 13/417,022 filed on Mar. 9, 2012 (now U.S. Pat. No. 9,662,600), the entire content of which is expressly incorporated hereinto by reference.

FIELD

The embodiments disclosed herein relate generally to high efficiency and high capacity glass-free fuel filtration media and to fuel filters and methods of filtering fuel which employ the same.

BACKGROUND

Filtration media possessing high filtration efficiency of small sized particulates generally requires small pores in the media so that the particulates to be filtered cannot pass through the media. Small pores in a media however generally result in low permeability and therefore cause high fluid pressure drop through the media. When particulates are captured physically on the upstream side of the media, they will over time gradually block the pores of the media which in turn cause the fluid pressure drop across the media to gradually increase. The quality of any filtration media is thus characterized by the amount of particulates that are capable of being captured (also known as "media capacity"), which occurs at a specific predetermined pressure drop. If the specific predetermined pressure is reached too rapidly, the resulting media capacity will thus be low. The general rule in the filtration industry is that the higher the efficiency possessed by a filtration media, the lower its capacity. Oftentimes therefore a compromise is needed to achieve both acceptable filtration media efficiency and capacity.

High efficiency filtration media, such as required for fuel filtration, often contain staple glass microfibers. Glass microfibers possess unique filtration properties due to their needle-like fiber shape, rigidity and small size. Glass microfibers are therefore widely used in conventional filtration media to provide both high efficiency and high capacity.

With increasing process pressure, for example during heavy-duty diesel fuel filtration, concerns have risen that glass microfibers could be washed out from the filtration media with the filtered fuel and thus enter and damage the internal combustion engine. In order to prevent problems that could result from glass microfibers leaching out of the filtration media, efforts have been made to develop high-efficiency and high capacity glass-free alternatives to glass microfiber-containing media. The leaching of glass microfibers into the downstream filtrate is not only of concern for internal combustion engine fuel filtration, but also for example in any kind of filtration that comes in contact with the human body, e.g. through ingestion.

Conventional commercially available glass-free filtration media often contain a base-media that provides the required filtration efficiency, e.g. from 100% wood pulp, and a laminated layer of fine staple fibers that provides the required filtration capacity. The manufacture of these conventional forms of filtration media requires high-pressure nipping of the media as well as a multi-stage manufacturing process including the lamination of the efficiency and the capacity layers, resulting in overall high production cost. The multi-layer structure of these conventional media often also results in relatively higher thickness, which is disadvantageous for the pleat geometry of the resulting filter.

It would therefore be highly desirable if filtration media could be provided which is glass-free (i.e., does not contain any glass fibers) but yet exhibits high filtration capacity and efficiency. Such filtration media should also possess a minimum strength sufficient to be further processed and/or pleated (e.g., so as to allow for the formation of filter units comprising such media). It is therefore towards fulfilling such desirable attributes that the present invention is directed.

SUMMARY OF EXEMPLARY EMBODIMENTS

According to one aspect, the embodiments disclosed herein provide for glass-free non-woven filtration media which is comprised of a blend of staple synthetic fibers and fibrillated cellulosic fibers. According to certain embodiments, the staple synthetic fibers will most preferably comprise or consist of synthetic microfibers. Optionally, the filtration media of certain other embodiments may contain non-fibrillated cellulosic fibers in an amount which does not significantly adversely affect the filtration efficiency and/or capacity of the media.

Certain embodiments will be in the form of high efficiency and high capacity glass-free non-woven filtration media comprising a blend of synthetic non-fibrillated staple fibers and fibrillated cellulosic staple fibers, wherein the fibrillated cellulosic fibers are present in the media in an amount to achieve an overall filtration efficiency at 4 microns of about 95% or higher and a ratio of filtration capacity to media caliper of 0.5 mg/in$^2$/mils and greater.

The synthetic non-fibrillated stable fibers may be formed of a thermoplastic polymer selected from the group consisting of polyesters, polyalkylenes, poyacrylonitriles, and polyamides. Polyesters, especially polyalkylene terephthalates, are especially desirable. Some embodiments will include non-fibrillated polyethylene terephthalate (PET) stable microfibers having an average fiber diameter of less than about 10 microns and an average length of less than about 25 millimeters. The synthetic staple fibers may be present in an amount between about 50 wt. % to about 99.5 wt. % ODW.

The fibrillated cellulosic staple fibers may comprise fibrillated lyocell nanofibers. Certain embodiments will include fibrillated lyocell nanofibers in an amount of between about 0.5 to about 50 wt. % ODW. The fibrillated cellulosic staple fibers may possess a Canadian Standard Freeness (CSF) of about 300 mL or less, for example between about 1 mL and about 300 mL.

Certain embodiments will include a blend of staple polyethylene terephthalate microfibers having an average fiber diameter of less than about 10 microns and an average length of less than about 25 millimeters which are present in an amount of between about 50 wt. % to about 99.5 wt. % ODW, and fibrillated lyocell staple fibers having a Canadian Standard Freeness (CSF) of about 300 mL or less which are present in an amount of at least about 0.5 to about 50 wt. % ODW. The fibrillated cellulosic fibers may have an average diameter of about 1000 nanometers or less and an average length between about 1 mm to about 8 mm.

The filtration media according to the embodiments disclosed herein will also possess the following properties:

(1) SD machine direction (MD) stiffness (SD MD Gurley Stiffness) of greater than about 2.5 g, for example, between about 2.5 g to about 5.0 g, according to TAPPI Standard T543 (the entirety of which is expressly incorporated by reference herein) using a 3.5 in. (md)×2 in. sample size and a test weight of 25 g placed at 4 in. from the pivot;

(2) a SD machine direction (MD) tensile strength of greater than about 20 lb/in, for example between about 20 to about 35 lb/in, according to TAPPI Standard T494 (the entirety of which is expressly incorporated by reference herein); and (3) a SD dry burst strength (SD MD Mullen Burst) of greater than about 30 psi, for example between about 30 psi to about 70 psi, according to TAPPI Standard T403 om-02 (the entirety of which is expressly incorporated by reference herein).

Other components and/or additives may be incorporated into the filtration media. By way of example, some embodiments may include natural wood pulp blended with the synthetic non-fibrillated staple fibers and fibrillated cellulosic staple fibers. If employed, the natural wood pulp may be present in an amount of about 25 wt. % ODW or less. Wet strength additives, optical brighteners, fiber retention agents, colorants, fuel-water separation aides (e.g., silicone additives and associated catalyzers), water or oil repellants (e.g., fluorocarbons), fire or flame retardants, and the like may also be employed as may be desired.

Resin binders may also be added to the filtration media to achieve desired physical properties. If employed, such binder resins may be present in an amount between about 2 to about 50 wt. % SDC.

The filtration media may be formed by a wet-laid slurry process. By way of example, the filtration media may be made by forming a wet laid sheet from a fibrous slurry comprised of a blend of synthetic non-fibrillated staple fibers and fibrillated cellulosic staple fibers, and drying the sheet to obtain the filtration media. The filtration media may be grooved and/or pleated so as to facilitate its use in filtration devices (e.g., filter units associated with on-board fuel filtration systems).

These and other attributes of the various embodiments according to the invention will be better understood by reference to the following detailed descriptions thereof.

BRIEF DESCRIPTION OF ACCOMPANYING DRAWINGS

DEFINITIONS

Figure 1:
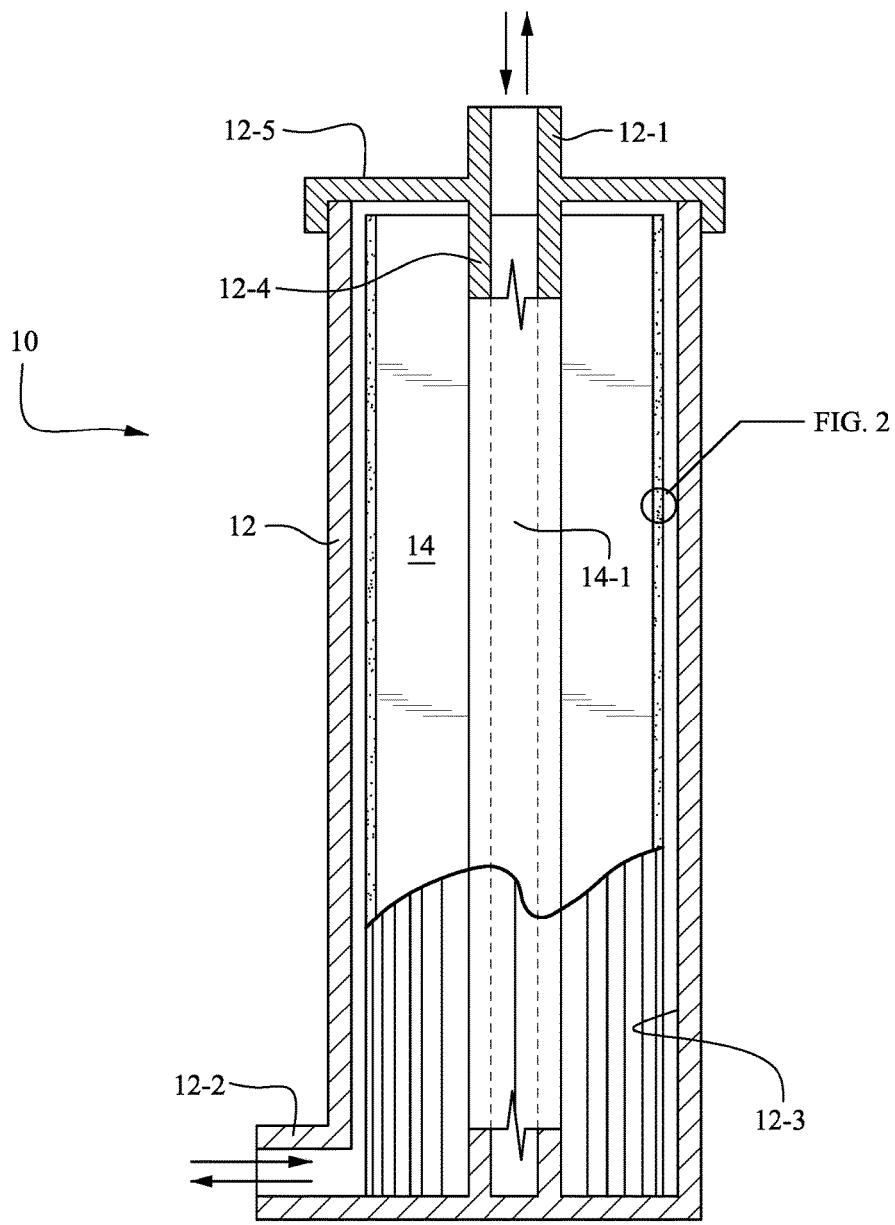
FIG. 1 is a schematic cross-sectional view of a filtration system that may embody the high efficiency filtration media of the embodiments disclosed herein.

As used herein and in the accompanying claims, the terms below are intended to have the definitions as follows.

"Fiber" is a fibrous or filamentary structure having a high aspect ratio of length to diameter.

"Staple fiber" means a fiber which naturally possesses or has been cut or further processed to definite, relatively short, segments or individual lengths.

"Nanofibers" mean fibers having an average diameter of less than about 1000 nanometers.

"Fibrous" means a material that is composed predominantly of fiber and/or staple fiber.

"Non-woven" means a collection of fibers and/or staple fibers in a web or mat which are randomly interlocked, entangled and/or bound to one another so as to form a self-supporting structural element.

"Synthetic fiber" and/or "man-made fiber" refers to chemically produced fiber made from fiber-forming substances including polymers synthesized from chemical compounds and modified or transformed natural polymer. Such fibers may be produced by conventional melt-spinning, solution- or solvent-spinning and like filament production techniques.

A "cellulosic fiber" is a fiber composed of or derived from cellulose.

"Multipass Dust Holding Capacity" and "Multipass Filtration Efficiency" filtration performance parameters measured using a multipass (MP) test according to ISO 19438: 2003, "Diesel fuel and petrol filters for internal combustion engines—Filtration efficiency using particle counting and contaminant retention capacity" (incorporated hereinto by reference). The media disclosed herein will possess a Multipass Dust Holding Capacity (DHC) of greater than about 10 mg/in$^2$, for example from about 15 mg/in$^2$ up to about 30 mg/in$^2$, and will possess Multipass Filtration Efficiencies of >95% at 4μ or greater, >80% at 2.5μ or greater, >70% at 2μ or greater and >50% at 1.5μ or grater.

"Freeness" is the measure, in mL, of the rate in which a dilute suspension of staple fiber may be drained, as described in TAPPI Canadian standard method T 227 om-94 (1994) (hereinafter sometimes referred to as "Canadian Standard Freeness" or "CSF"), the entire content of which is expressly incorporated hereinto by reference.

"Fibrils" are tiny, minute irregular threadlike elements associated with a staple fiber.

"Fibrillated" means staple fibers that have been further acted upon to form numerous fibrils and which exhibit a Canadian Standard Freeness of about 300 mL or less, preferably about 200 mL or less, typically between about 10 to about 200 mL.

"Non-fibrillated" means unprocessed staple fibers having essentially no fibrils and which exhibit a Canadian Standard Freeness of greater than about 500 mL.

"Fibrillatable" means non-fibrillated staple fibers that inherently possess the ability to be fibrillated using standard mechanical beaters, refiners and the like employed in the paper-making industry.

"Oven-dry weight" or "ODW" means the total weight of fibers or fabric after drying in a hot air oven at 350° F. (177° C.) for 5 minutes.

"Saturated dry cured" or "SDC" means a media saturated with resin, air-dried or dried at low heat for a time sufficient to evaporate solvent from the resin and cured in a hot air oven at 350° F. (177° C.) for 5 minutes.

"Saturated Dry" or "SD" means a media saturated with resin and dried for a time sufficient to evaporate solvent from the resin but not fully cured, for example a sample having between about 20% to about 95% of cured resin for typical SD media as determined by the "Wet Mullen Ratio" (%) of the media.

"Wet Mullen Ratio" is used to indicate the resin cure level of media and is calculated by dividing the wet SD Mullen burst strength of the sample by the wet SDC Mullen burst strength of the sample and expressing such ratio as a percentage. The fully cured (SDC) sample of the filtration media will exhibit the highest wet Mullen burst strength that the media is capable of exhibiting. Wet Mullen burst strength is measured on a sample saturated with water having a concentration of ionic surfactant in the amount of approximately 0.03 wt %, according to TAPPI Standard T403 om-02.

DETAILED DESCRIPTION

Accompanying FIG. 1 depicts a schematic exemplary filtration system 10 in which the filtration media as disclosed herein may be employed. In this regard, the system 10 is provided with a housing 12 having ports 12-1 and 12-2 through which a liquid flow of a fluid (e.g., liquid or gas) to be filtered can be introduced or discharged. It is of course to be understood that either the port 12-1 or the port 12-2 may serve as an inlet port while the other of port 12-1 or port 12-2 serves as a discharge port depending on the fluid flow within the system 10 that may be desired for any end use application.

The housing 12 includes an interior space 12-3 for holding the filtration media 14. In the embodiment depicted, the filtration media 14 is in the form of a generally cylindrical structure comprised of a number of longitudinally oriented pleats. Other structural forms of the separation media 14 are of course possible, for example, spirally wound sheets. The fluid to be entered may therefore enter the core 14-1 of the media 14 and then pass therethrough in the event that the fluid enters the port 12-1 with the filtered fluid then being discharged through port 12-2. A reverse flow may also be practiced, e.g., the fluid to be filtered may enter the port 12-2 so as to then pass from the outside periphery of the media 14 towards the core 14-1 whereby the filtered fluid then is discharged through port 12-1.

The housing 12 may optionally be provided with a tubular core element 12-4 having suitable perforations or apertures to allow the fluid to pass therethrough. One element of the housing 12, e.g., a cap 12-4, may also be removable so as to allow the filtration media 14 to be replaced once its filtration capacity has been attained. Alternatively, the filtration system 10 may be embodied as a disposable module, in which case the housing 12 with the spent filtration media 14 therein may be discarded and replaced with a fresh housing 12 and filtration media 14, e.g., at an appropriate service interval.

Figure 2:
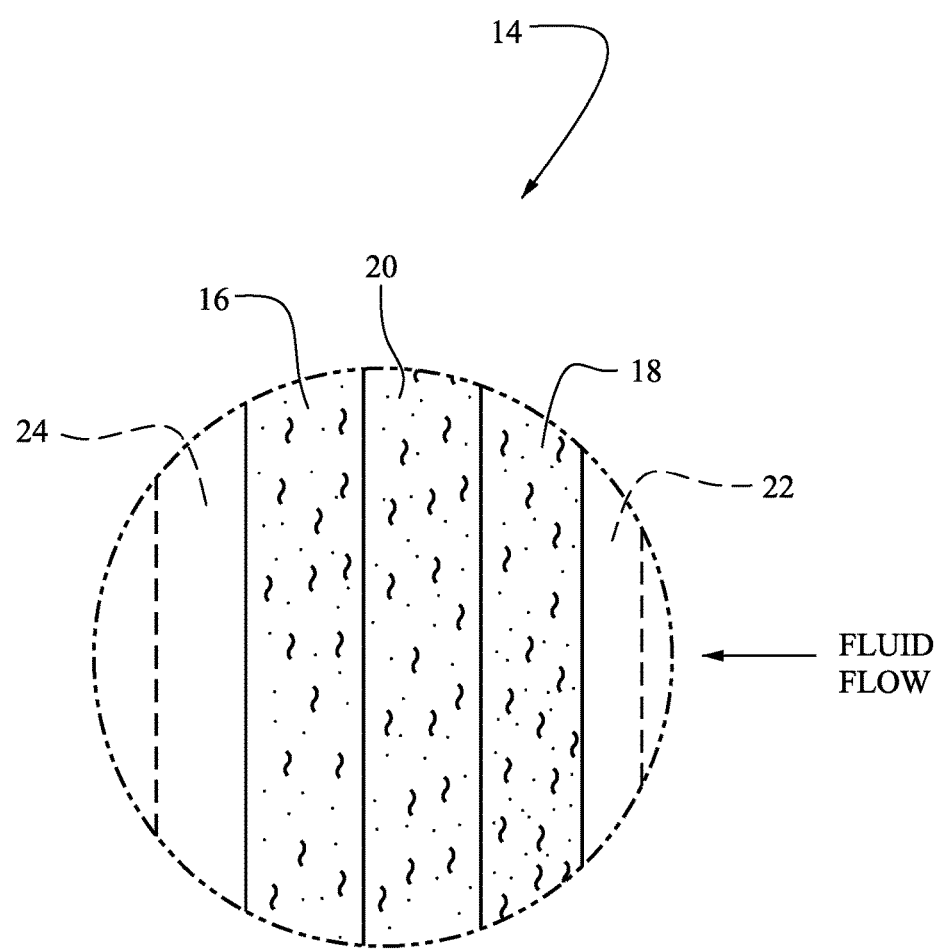
FIG. 2 is an enlarged schematic cross-sectional view of an exemplary filtration media embodiment as taken along line 2-2 in FIG. 1
Figure 3:
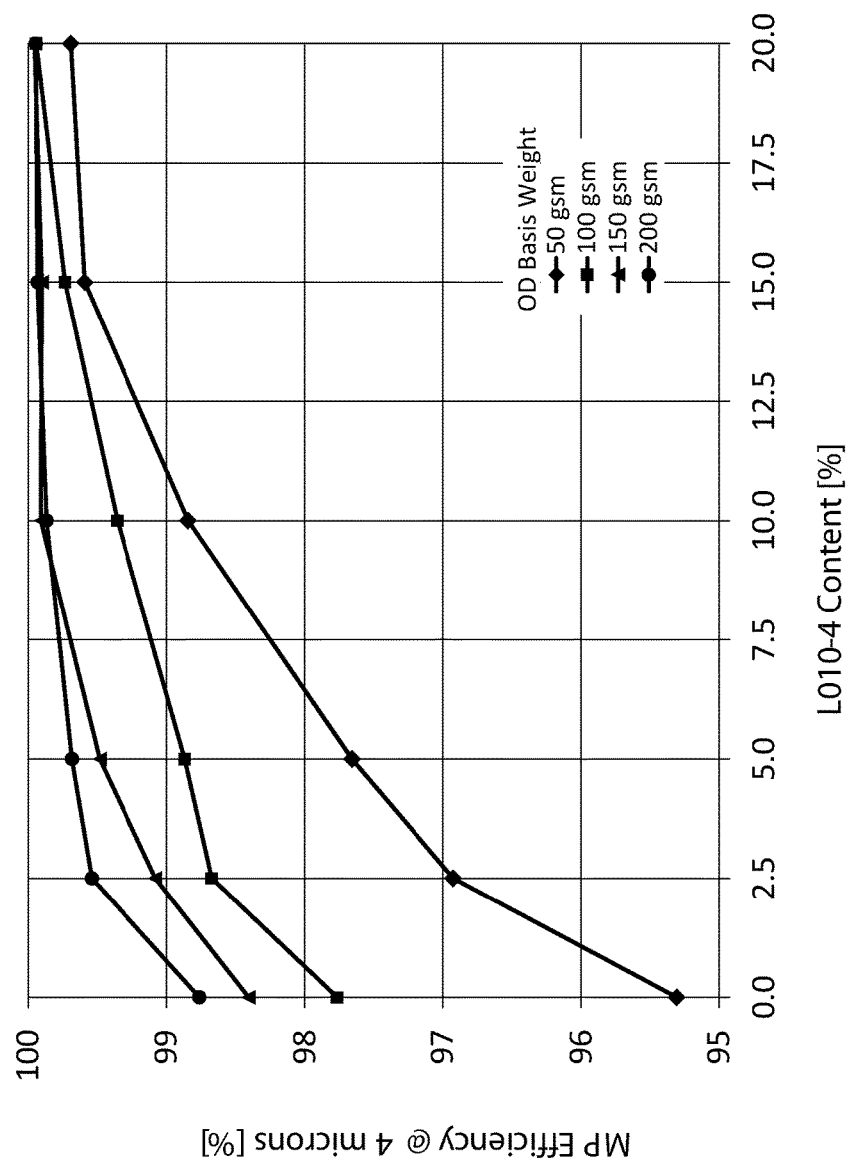
FIG. 3 is a plot of multipass (MP) efficiency (%) at 4 microns versus the content of fibrillated Lyocell nanofibers (wt. %) present in the filtration media.

As is perhaps better shown in accompanying FIG. 2, the filtration media 14 may be a multilayer structure comprised of at least a filtration media layer 16 in accordance with the embodiments disclosed herein positioned downstream of a fibrous woven or nonwoven layer 18. Alternatively, one or more intermediate layer(s) 20 may optionally be interposed between the upstream filtration media layer 16 and the downstream layer 18, if present. The layers 18 and/or 20 if present may be provided so as to impart additional functional attributes to the media, e.g., pre-filtration, structural support, water droplet separation and the like. Such layers 18, 20 may be positioned immediately adjacent one another and may if desired be physically laminated or physically connected to one another (e.g., by any suitable technique known in the art such as needle punching, adhesives, air jet entanglement and the like).

In addition (or alternatively) one or more face layers 22 may be provided upstream of the filtration media layer 16, while one or more backing layers 24 may be provided downstream of the fibrous layer 18. Layers 22 and 24 may be selected for various functional attributes and do not necessarily need to be nonwoven or woven fibrous structures, for example, one or both such layers may be metal mesh or perforated film structures to serve various functions in the media 14. Of course, any such additional layers 18, 20, 22 and/or 24 must not affect adversely the high efficiency filtration functionality of the filtration media layer 16.

The additional layers 18, 20 and/or 22 may be formed of virtually any woven or nonwoven (e.g., melt-blown) fibrous thermoplastic materials such as polyolefins (e.g., polypropylenes, polyethylenes, polybutylenes or the like), polyamides (PA) (e.g., PA-6, PA-6,6, PA-6,12 and the like), polyesters (e.g., polybutylene terephthalates (PBT), polyethylene terephthalates (PET), polybutylene naphthalates (PBN), polylactic acid (PLA), polyethylene naphthalates (PEN) and the like), fluoropolymers (e.g., polyvinylidene fluoride (PVDF) and the like), and polyurethanes to name a few. The layers may alternatively or additionally be provided with cellulosic materials, such as regenerated cellulose.

Any one or all of the additional layers, if present, could alternatively be the same as the filtration media layer 16 in accordance with the embodiments disclosed herein. Thus, if multiple filtration media layers 16 are provided, they may be immediately adjacent to one another or may include one or more layers of the types disclosed above interposed therebetween.

Filtration systems in which the filtration media layer 16 as described herein may be employed are well known in the art. For example, U.S. Pat. Nos. 8,287,727 and 8,096,423 describe replaceable filter elements inside a fuel filter housings comprising annularly arranged filter media that is sealed at the end faces. U.S. Pat. Nos. 6,814,243 and 8,501,003 are additional examples of filter systems, which have a removable filter element inside and also incorporate a drain in the canister. U.S. Pat. Nos. 5,643,446 and 8,293,103 disclose spin-on filter cartridges with a pleated filter element inside where the cartridge can be removed and replaced entirely when needed. U.S. Pat. No. 6,328,883 describes a filter housing with a manual priming pump and a heater assembly. U.S. Pat. No. 8,696,894 discloses a filter element that comprises a filter material arranged in folds with a heating element placed between two folds. U.S. Pat. No. 7,527,739 discloses a filter housing that facilitates multi-stage fuel-water separation comprising a filter placed within another filter or two filter elements arranged in series. (The entire content of each of the US Patents cited above are expressly incorporated hereinto by reference.)

A. Non-Fibrillated Staple Synthetic Fibers

Virtually any conventional synthetic non-fibrillated staple fibers may be employed in the filtration media of this invention. Especially preferred embodiments will include synthetic non-fibrillated staple fibers formed of a thermoplastic polymer, such as polyesters (e.g., polyalkylene terephthalates such as polyethylene terephthalate (PET), polybutylene terephthalate (PBT) and the like), polyalkylenes (e.g., polyethylenes, polypropylenes and the like), poyacrylonitriles (PAN), and polyamides (nylons, for example, nylon-6, nylon 6,6, nylon-6,12, and the like). Preferred are staple PET fibers.

The synthetic staple fibers are most preferably microfibers, that is staple fibers which possess average fiber diameters of less than about 10 microns, sometimes less than about 8 microns or even less than about 5 microns, and lengths of less than about 25 millimeters, sometimes less than about 10 millimeters, such as less than about 6.5 millimeters (e.g., less than about 3.5 millimeters).

Particularly preferred synthetic staple microfibers are water dispersible polyalkylene terephthalate microfibers. Preferred are staple polyethylene terephthalate (PET) microfibers. In certain preferred embodiments, the staple PET microfibers are the result of water-washing of water non-dispersible sulfopolyester fibers having a glass transition temperature (Tg) of at least 25° C., the sulfopolyester comprising: (i) about 50 to about 96 mole % of one or more residues of isophthalic acid or terephthalic acid; (ii) about 4 to about 30 mole %, based on the total acid residues, of a residue of sodiosulfoisophthalic acid; (iii) one or more diol residues wherein at least 25 mole %, based on the total diol residues, is a poly(ethylene glycol) having a structure H—$(OCH_2$—$CH_2)_n$—OH, wherein n is an integer in the range of 2 to about 500; and (iv) 0 to about 20 mole %, based on the total repeating unites, of residues of a branching monomer having 3 or more hydroxyl, and/or carboxyl functional groups. These preferred synthetic staple PET microfibers and their methods of production are more fully described in US Published Patent Application Nos. 2008/0311815 and 2011/0168625 (the entire content of each being expressly incorporated hereinto by reference) and are commercially available from Eastman Chemical Company, Kingsport, Tenn.

The synthetic staple fibers will be employed in the filtration media in an amount between about 50 wt. % to about 99.5 wt. % ODW, preferably between 75 wt. % to about 97.5 wt. % ODW. Especially preferred embodiments will include the synthetic staple fibers in an amount between about 80 wt. % to about 90 wt. % ODW.

B. Cellulosic Fibers

The filtration media will necessarily include fibrillated cellulosic staple fibers which possess a Canadian Standard Freeness (CSF) of about 300 mL or less, preferably about 200 mL or less, typically between about 10 to about 200 mL.

Preferred fibrillatable cellulosic staple fibers are those made by direct dissociation and spinning of wood pulp in an organic solvent, such as an amine oxide, and are known as lyocell staple fibers. The fibrillatable cellulose staple fibers may thus be fibrillated by being subjected to standard mechanical beaters, refiners and the like employed in the paper-making industry.

The fibrillated cellulosic staple fibers will be employed in the filtration media in an amount between about 0.5 to about 50 wt. % ODW, preferably between 2.5 to about 25 wt. % ODW. Especially preferred embodiments will include the fibrillated cellulosic staple fibers in an amount between about 10 to about 20 wt. % ODW.

Especially preferred fibrillated cellulosic staple fibers include lyocell staple fibers. The lyocell staple fibers are most preferably nanofibers, that is staple fibers having an average diameter of about 1000 nanometers or less, or sometimes about 400 nanometers or less, for example about 100 nanometers. Some especially preferred embodiments will include fibrillated cellulosic staple fibers of about 250 nanometers. The average length of the Lyocell staple nanofibers is typically between about 1 mm to about 8 mm, or between about 2 mm to about 6 mm, or about 3 mm to about 4 mm.

Preferred fibrillated lyocell nanofibers are commercially available from Engineered Fibers Technology, LLC under the tradename EFTec™ Nanofibrillated Fibers. Preferred commercially available forms of the fibrillated lyocell nanofibers include EFTec™ L010-4, L040-4 and L200-6 Nano-fibrillated fibers having degrees of fibrillation at 4 mm or 6 mm fiber length of ≤10 CSF, 40 CSF and 200 CSF, respectively.

Other non-fibrillated cellulosic staple fibers may optionally be blended with the non-fibrillated synthetic staple fibers and the fibrillated cellulosic staple fibers so as to impart additional stiffness to the filtration media. According to some embodiments, therefore, the addition of from 0 up to about 25 wt. % ODW, for example, from 0 wt. % to about 20 wt. % ODW or to about 15 wt. % ODW, of natural wood pulp (non-lyocell) staple fibers may be desired. A variety of non-lyocell non-fibrillated cellulosic staple fibers are commercially available and may be blended with the other components of the filter media disclosed herein as may be desired.

C. Other Components

The filtration media according to certain embodiments may include a resin binder to achieve desired physical properties. Any suitable resin binders may be added to the filtration media for such a purpose. Suitable examples of binder resins that may optionally be employed include polymers such as styrene acrylic, acrylic, polyethylene vinyl chloride, styrene butadiene rubber, polystyrene acrylate, polyacrylates, polyvinyl chloride, polynitriles, polyvinyl acetate, polyvinyl alcohol derivates, starch polymers, epoxy, phenolics and combinations thereof, including both waterborne or solvent versions. In some cases, the binder resin may be in the form of a latex, such as a water-based emulsion.

If employed, the resin binder may be present in amounts between about 2 to about 50 wt. % SDC, preferably between 10 to about 30 wt. % SDC. Especially preferred embodiments will include the resin binder in an amount between about 12 to about 25 wt. % SDC.

Preferred resin binders include phenolic resins, acrylic resins (e.g., vinyl acrylic latex resins), melamine resins, silicone resins, epoxy resins and the like. One phenolic (phenolformaldehyde) resin that may be employed includes DURITE® SL161A commercially available from Momentive Specialty Chemicals Inc. of Louisville, Ky. One suitable latex based resin binder that may be employed is PD 0458 M1 (a polyoxymethylene nonylphenol branched ether phosphate dispersed in formaldehyde) commercially available from HB Fuller Co. of St. Paul, Minn. A suitable melamine binder resin may be ASTRO® Celrez PA-70 methylated melamine resin system commercially available from Momentive Specialty Chemicals Inc. of Louisville, Ky. Suitable acrylic resins include ACRODUR® formaldehyde-free water-based acrylic resins commercially available from BASF Corporation.

The filtration media may also contain additives conventionally employed in wet-laid filtration media, such as for example, wet strength additives, optical brighteners, fiber retention agents, colorants, fuel-water separation aides (e.g., silicone additives and associated catalyzers), water or oil repellants (e.g., fluorocarbons), fire or flame retardants, and the like. If present, these additives may be included in amounts of up to about 20 wt. % ODW, preferably up to about 10 wt. % ODW, for example between about 1 to about 10 wt. %.

D. Methods of Making

The filtration media described herein may be made by any conventional "wet-laid" paper-making technology. Thus, for example, predetermined amounts of the non-fibrillated synthetic staple fibers and the fibrillated cellulosic staple fibers (along with any optional components, such as the natural wood pulp fibers and/or additives) and water may be placed in a pulper or beater. The fibers are mixed and dispersed by the pulper or beater evenly in the water to form a slurry batch. Some mechanical work can also be performed on the fibers to affect physical parameters, such as permeability, surface properties and fiber structure. The slurry batch may thereafter be transferred to a mixing chest where additional water is added and the fibers are homogenously blended. The blended slurry may then be transferred to a machine chest where one or more slurry batches can be combined, allowing for a transfer from a batch to a continuous process. Slurry consistency is defined and maintained by agitation to assure even dispersion of fibers. In this regard, the slurry may optionally be passed through a refiner to adjust physical parameters.

The slurry is then transferred to a moving wire screen where water is removed by means of gravity and suction. As water is removed, the fibers form into a fibrous nonwoven mat or sheet having characteristics determined by a number of process variables, including for example, the slurry flow rate, machine speed, and drainage parameters. The formed sheet may optionally be compressed while still wet so as to compact the paper and/or modify its surface characteristics. The wet paper mat is then moved through a drying section comprised of heated rollers (or "cans" in art parlance) where most of the remaining entrained water is removed. The dried web may then have a binder applied by any conventional means, such as dipping, spray coating, roller (gravure) application and the like. Heat may then subsequently be applied to dry the web.

If employed as a pleated filtration media, the dried web may advantageously be subjected to machine-direction (longitudinal) grooving using mated male/female rollers. If employed, the media may have about 50 longitudinally extending grooves per 200 mm of media width. Each groove will thus preferably have a nominal width of about 4 mm. A typical grooved glass-containing high-efficiency fuel grade has dimensions such as overall SD (saturated and dried, but not cured) caliper of about 38 mils, SD groove depth of about 13 mils, and SD optical caliper A (optical measurement of media thickness in one groove, therefore representing corresponding flat thickness) of about 28 mils.

The finished (optionally grooved) filtration media may then be taken up on a roll for further processing into finished filter products. For example, one or more finished filtration media sheets may be laminated with one or more other sheets of material (e.g., at least one additional filtration media layer, supporting layer and the like) to achieve desired physical and performance characteristics. The filtration media may also be pleated and formed into a cylindrical filter cartridge that may then be provided as a component part of a filtration unit (e.g., an on-board fuel filter unit). Co-pleating of the filtration media with a supporting wire mesh layer may be desirable in certain end use applications.

The basis weight of the finished filtration media is not critical. Thus, the finished filtration media may have a basis weight of at least about 15 grams per square meter (gsm), more preferably at least about 35 gsm up to about 300 gsm. Some embodiments of the filtration media may possess a basis weight of between about 50 up to about 200 gsm.

The present invention will be further illustrated by the following non-limiting examples thereof.

EXAMPLES

Example 1

In the examples described below, the following components were employed:

PET Microfibers: Non-fibrillated PET staple microfibers having an average diameter of 2.5 microns, commercially available from Eastman Chemical Company, Fibrillated Lyocell: Fibrillated lyocell nanofibers commercially available from Engineered Fibers Technology LLC under the tradename EFTec™ fibers with Lyocell L010 having a CSF of ≤10 mL; Lyocell L040 having a CSF of 40 mL; and Lyocell L200 having a CSF of 200 mL.

Sodra Red: Chemi-Thermal-Mechanical (CTM) Softwood pulp with a Freeness of 600-700 ml and SR of 15, and a pH of 7.5, manufactured by Södra, Sweden. Bulk is 4 cm3/g.

Alabama Pine or Alabama River Softwood: Southern Softwood elemental chlorine free (ECF) Kraft Pulp manufactured by Georgia-Pacific, USA with CSF ranges from 300 to 740 ml and bulk of 1.48-2.1 $cm^3/g$.

HPZIII: Mercerized southern softwood from Buckeye Technologies, Inc. having an average fiber length of 1.8 mm and 7.3 $cm^3/g$ bulk GRAND PRAIRIE: Northern softwood from Weyerhaeuser Co. having average fiber length of 2.3 mm, CSF ranges from 648-300, bulk ranges from 1.52-1.24 $cm^3/g$.

FIBRIA: Fibria ECF Bleached Eucalyptus Pulp from Aracruz Cellulose (USA) Incorporated having a drainability of 22-55 SR and a fiber length of about 0.70 mm KYMENE: A wet strength additive consisting of 12-13% solids of an aqueous solution of a cationic amine polymer-epichlorohydrin adduct having specific gravity is 1.03, pH is 3.5-4.5 and the solution contains 12-13% solids.

MOMENTIVE 161A: EPON™ Resin 161, a multifunctional epoxidized phenolic novolac resin binder commercially available from Momentive Specialty Chemicals, Inc. and having a epoxide equivalent weight of 169-178 g/eq (ASTM D1652), a viscosity (25° C.) of 18,000-28,000 cP (ASTM D2196) and a density (25° C.) of 10.0 lb/gal.

Procedure:

The samples were produced using a laboratory wetlaid hand sheet mold. The furnish as described in the recipe was mixed with 2 liters of tap water and disintegrated with a standard laboratory disintegrator (Noram) for 1500 revolutions. The furnish was then poured into the wetlaid mold and diluted with approx. 25 liters of tap water, stirred 3 times with a pedal stir, and drained through a standard paper machine wire.

The hand sheets were then squeezed dry with a couching roller rolled across 3 times, pre-dried in a flat bed speed oven for 5 minutes at 350° F. and subsequently dried in an oven for 5 minutes at 350° F. Raw physical data such as raw basis weight, caliper, air permeability were taken immediately after oven drying.

The samples were then saturated with a standard phenolic resin (161A from Momentive Specialty Chemicals, Inc.) at a content of 16% (bath solids of resin bath were 18% in methanol as solvent). The samples were then air dried for 24 hours in ambient conditions, and cured to arrive at the SDC (saturated dried cured) level at 350° F. for 5 minutes. SDC basis weight was recorded immediately after curing, and other SDC data such as SDC caliper and SDC air permeability were measured subsequently. Specifically, these physical parameters were measured as follows:

SDC Caliper: The caliper (thickness) of SDC media was measured using a 89-100 Thickness Tester from Thwing-Albert Instrument Company according to TAPPI Standard T411, "Thickness (caliper) of paper, paperboard and combined board" (incorporated fully by reference herein).

SDC Air Permeability: The air permeability of SDC media was tested with a FX3300 LabAir IV Air Permeability Tester from TexTest, according to ASTM D737, "Standard Test Method for Air Permeability of Textile Fabrics" incorporated fully by reference herein). Measurements were recorded at 125 Pa in Cubic Feet per Minute (cfm) per area of one square foot.

Filtration performance was measured using a multipass (MP) test according to ISO 19438:2003 which specifies a multi-pass filtration test, with continuous contaminant injection using the on-line particle counting method, for evaluating the performance of fuel filters for internal combustion engines submitted to a constant flow rate of test liquid. The test procedure determines the contaminant capacity of a filter, its particulate removal characteristics and differential pressure. ISO 19438:2003 is applicable to filter elements having a rated flow of between 50 l/h and 800 l/h; however, by agreement between filter manufacturer and customer, and with some modification, the procedure is permitted for application to fuel filters with higher flow rates. The parameters employed in the MP Test are:

Test dust used: ISO Fine

Flow rate: 1.89 liter/min

Oil viscosity: 15 $mm^2/s$ @43° C.=109° F.

Injection gravimetric: 75.7 mg/liter

BUGL (Basic Upstream Gravimetric Level): 10 mg/liter

Hand sheets were made using 2.5 micron PET microfiber (Eastman Chemical Company), different grades of fibrillated lyocell (Grades L010, L040, L200 from Engineered Fibers Technology, LLC), and three different types of wood pulp. Most hand sheets also contained Kymene, a wet strength additive, to imitate production conditions, in amounts noted in the tables below.

The "Capacity/Caliper Ratio" was calculated by dividing the media capacity ($mg/in^2$) by the media caliper (mils) in order to normalize the capacity data to account for different sheet caliper thickness. "Overall efficiency at 4 microns" was determined using the multipass (MP) filtration test described previously.

TABLE 1

| | Composition | | | | | | | | | |
|---|---|---|---|---|---|---|---|---|---|---|
| | Furnish Composition | | | | Resin | Physical Properties - | | | Multipass | Normalized |
| | % PET | | | | Overall % | Saturated, Dried, Cured | | | Performance | Capacity: = |
| Hand Sheets | Microfiber Eastman PET Microfiber | % Fibrillated Lyocell L010 | L040 | L200 | % Wet Strength Additive Kymene | Phenolic Resin Momentive 161A | SDC Basis Weight [g/m2] | SDC Caliper [mils] | SDC Air Permeability [cfm] @ 125 Pa | Apparent Capacity [mg/inch2] | Overall Efficiency @ 4 microns [%] | Capacity/ Caliper [mg/inch2/ mils] |
| 61 | 84 | 16 | | | 1.0 | 16.9 | 111 | 19.3 | 2.37 | 18.3 | 99.8 | 0.95 |
| 30 | 86 | 14 | | | 1.0 | 16.7 | 111 | 20.2 | 2.77 | 21.3 | 99.8 | 1.05 |
| 52 | 94 | 6 | | | 1.0 | 16.3 | 110 | 18.2 | 3.04 | 17.7 | 99.2 | 0.97 |
| 32 | 89 | 11 | | | 1.0 | 16.8 | 111 | 24.9 | 3.36 | 20.1 | 99.5 | 0.81 |
| 63 | 97 | 3 | | | 1.0 | 13.7 | 108 | 16.7 | 3.62 | 21.1 | 99.0 | 1.26 |
| 4 | 85 | 15 | | | 1.0 | 16.2 | 139 | 33.0 | 2.60 | 21.3 | 98.8 | 0.64 |
| 29 | 93 | 7 | | | 1.0 | 17.7 | 141 | 27.4 | 2.74 | 21.1 | 99.4 | 0.77 |
| 34 | 93 | 7 | | | 1.0 | 16.8 | 140 | 25.3 | 3.00 | 20.7 | 99.2 | 0.82 |
| 39 | 95 | 5 | | | 1.0 | 17.5 | 141 | 30.9 | 3.45 | 21.9 | 99.2 | 0.71 |
| 50 | 100 | 0 | | | 1.0 | 17.3 | 141 | 29.6 | 3.70 | 21.0 | 97.9 | 0.71 |
| 26 | 90 | 10 | | | 1.0 | 16.7 | 175 | 34.0 | 2.49 | 22.2 | 99.7 | 0.65 |
| 59 | 94 | 6 | | | 1.0 | 17.4 | 176 | 39.0 | 2.70 | 21.3 | 99.4 | 0.55 |
| 54 | 100 | 0 | | | 1.0 | 17.2 | 176 | 31.9 | 2.98 | 21.9 | 98.9 | 0.69 |
| 58 | 75 | | 25 | | 1.0 | 17.8 | 112 | 27.0 | 2.32 | 19.4 | 99.9 | 0.72 |
| 60 | 77 | | 23 | | 1.0 | 18.1 | 112 | 24.9 | 2.58 | 19.0 | 99.8 | 0.76 |
| 44 | 81 | | 19 | | 1.0 | 16.6 | 111 | 31.2 | 3.00 | 23.5 | 99.8 | 0.75 |
| 38 | 85 | | 15 | | 1.0 | 16.9 | 111 | 27.6 | 3.17 | 21.7 | 99.7 | 0.79 |
| 18 | 85 | | 15 | | 1.0 | 17.9 | 112 | 26.8 | 3.39 | 24.5 | 99.6 | 0.92 |
| 20 | 85 | | 15 | | 1.0 | 16.7 | 111 | 30.3 | 3.41 | 25.4 | 99.7 | 0.84 |
| 56 | 83 | | 17 | | 1.0 | 18.6 | 142 | 30.7 | 2.48 | 20.1 | 99.8 | 0.65 |
| 64 | 85 | | 15 | | 1.0 | 14.1 | 137 | 37.3 | 2.76 | 20.8 | 99.7 | 0.56 |
| 10 | 91 | | 9 | | 1.0 | 17.2 | 141 | 33.4 | 3.03 | 22.0 | 99.4 | 0.66 |
| 7 | 87 | | 13 | | 1.0 | 16.7 | 140 | 39.5 | 3.37 | 22.4 | 99.6 | 0.57 |
| 24 | 92 | | 8 | | 1.0 | 17.7 | 141 | 38.3 | 3.38 | 25.5 | 99.3 | 0.67 |
| 27 | 90 | | 10 | | 1.0 | 19.1 | 179 | 42.5 | 2.74 | 24.9 | 99.6 | 0.59 |
| 43 | 91 | | 9 | | 1.0 | 16.8 | 175 | 43.2 | 3.04 | 24.3 | 99.5 | 0.56 |
| 42 | 93 | | 7 | | 1.0 | 18.2 | 177 | 44.6 | 3.21 | 26.6 | 99.3 | 0.60 |
| 53 | 98 | | 2 | | 1.0 | 18.8 | 178 | 42.2 | 3.25 | 22.5 | 98.4 | 0.53 |
| 57 | 98 | | 2 | | 1.0 | 21.3 | 182 | 40.3 | 3.39 | 21.8 | 98.8 | 0.54 |
| 33 | 89 | | | 11 | 0.3 | 15.7 | 190 | 30.9 | 2.08 | 26.7 | 99.9 | 0.87 |
| 36 | 92 | | | 8 | 0.3 | 15.9 | 189 | 31.4 | 2.40 | 25.8 | 99.8 | 0.82 |
| 39 | 97 | | | 3 | 0.3 | 15.2 | 185 | 29.9 | 2.92 | 26.5 | 99.3 | 0.89 |
| 40 | 100 | | | 0 | 0.3 | 15.5 | 157 | 29.6 | 3.20 | 24.2 | 98.7 | 0.82 |
| | 70 | | | 30 | 0.3 | 13.8 | 52 | 7.4 | 2.48 | 20.6 | 99.9 | 2.78 |
| | 60 | | | 40 | 0.3 | 12.8 | 53 | 8.9 | 1.96 | 19.5 | 100.0 | 2.20 |
| | 98 | | | 2 | 0.3 | 14.6 | 190 | 29.1 | 2.83 | 26.7 | 99.9 | 0.92 |

TABLE 1-continued

| | Composition | | | | | Resin | Physical Properties - | | | Multipass | | Normalized |
| | Furnish Composition | | | | | Overall % | Saturated, Dried, Cured | | | Performance | | Capacity: = |
| | % PET | | | | | Phenolic | SDC | | | Apparent | Overall | Capacity/ |
| | Microfiber | | | | % Wet | Resin | Basis | SDC | SDC Air | Capacity | Efficiency | Caliper |
| | Eastman | % Fibrillated Lyocell | | | Strength | Momentive | Weight | Caliper | Permeability | [mg/in²] | @ 4 microns | [mg/inch2/ |
| Hand Sheets | PET Microfiber | L010 | L040 | L200 | Additive Kymene | 161A | [g/m2] | [mils] | [cfm] @ 125 Pa | [mg/inch2] | [%] | mils] |
|---|---|---|---|---|---|---|---|---|---|---|---|---|
| | 90 | 10 | | | 0.3 | 14.4 | 189 | 27.3 | 1.86 | 27.3 | 99.9 | 1.00 |
| 41 | 89 | | 11 | | 0.3 | 16.9 | 189 | 33.9 | 2.99 | 25.8 | 99.2 | 0.76 |
| 43 | 75 | | 25 | | 0.3 | 16.1 | 187 | 33.4 | 2.80 | 17.8 | 99.5 | 0.53 |
| 45 | 50 | | | 50 | 0.3 | 16.9 | 185 | 31.6 | 2.18 | 20.7 | 99.9 | 0.65 |
| 46 | 95 | 5 | | | 0.3 | 15.3 | 186 | 29.2 | 2.63 | 23.1 | 99.5 | 0.79 |
| 47 | 92 | 8 | | | 0.3 | 15.3 | 186 | 36.0 | 2.45 | 23.0 | 99.8 | 0.64 |
| 48 | 89 | 11 | | | 0.3 | 17.0 | 189 | 33.9 | 2.05 | 23.1 | 99.9 | 0.68 |

The data in Table 1 above demonstrate that filtration media formed of PET microfibers and fibrillated lyocell microfibers exhibited an advantageous capacity/caliper ratio of 0.5 mg/in²/mils and greater at approximately 98% efficiency at 4 microns or higher.

Example 2

Example 1 was repeated except that filtration media was formed on a standard Fourdrinier wet-laid paper line. The results of these trials are shown in Table 2 below.

The data in Table 2 above confirms that the capacity/caliper ratio is 0.5 mg/in²/mils and greater for all basis weights, even though the ratio tends to decrease with an increase in basis weight. The data also shows that the media had acceptable filtration efficiency of 95% or greater at 4 microns, typically 97% or greater at 4 microns.

Example 3

Example 1 was repeated with different amounts of natural wood pulp blended with the PET microfibers and fibrillated lyocell microfibers in varying amounts. The data appear in Tables 3A and 3B below.

TABLE 2

| | Composition | | | Resin | Physical Properties - | | | Multipass | | Normalized |
| | Furnish Composition | | | Overall % | Saturated, Dried, Cured | | | Performance | | Capacity: = |
| | % PET Microfiber | % Fibrillated Lyocell | % Wet Strength | Phenolic Resin | SDC Basis | | SDC Air Permeability | Apparent Capacity | Overall Efficiency | Capacity/ Caliper |
| Roll Sample | 2.5 microns | L010-4 | Additive Kymene | Momentive 161A | Weight [g/m2] | SDC Caliper [mils] | [cfm] @ 125 Pa | [mg/in²] [mg/inch2] | @ 4 microns [%] | [mg/inch2/ mils] |
|---|---|---|---|---|---|---|---|---|---|---|
| 1A | 84 | 16 | 0.1 | 17 | 139 | 18.4 | 2.58 | 17.0 | 98.4 | 0.92 |
| 2A | 84 | 16 | 0.1 | 17 | 145 | 19.0 | 2.76 | 16.4 | 97.6 | 0.86 |
| 3A | 84 | 16 | 0.1 | 17 | 115 | 18.1 | 3.37 | 16.9 | 97.4 | 0.93 |
| 4B | 84 | 16 | 0.1 | 17 | 96 | 14.5 | 4.73 | 18.2 | 94.2 | 1.26 |
| 7A | 86 | 14 | 0.1 | 17 | 151 | 16.7 | 1.96 | 18.0 | 99.6 | 1.08 |
| 8B | 86 | 14 | 0.1 | 17 | 180 | 21.2 | 1.54 | 15.1 | 99.9 | 0.71 |
| 9B | 86 | 14 | 0.1 | 17 | 177 | 22.9 | 1.58 | 17.0 | 99.8 | 0.74 |
| 10B | 86 | 14 | 0.1 | 17 | 198 | 24.8 | 1.42 | 14.1 | 99.9 | 0.57 |
| 11A | 89 | 11 | 0.1 | 17 | 139 | 18.0 | 3.33 | 21.3 | 97.6 | 1.18 |
| 12B | 89 | 11 | 0.1 | 17 | 125 | 16.8 | 3.96 | 20.8 | 94.9 | 1.24 |
| 13B | 89 | 11 | 0.1 | 17 | 174 | 22.1 | 2.44 | 21.2 | 99.1 | 0.96 |
| 14B | 89 | 11 | 0.1 | 17 | 144 | 20.6 | 3.84 | 22.5 | 95.4 | 1.09 |

TABLE 3A

| | Composition | | | | | | | | |
|---|---|---|---|---|---|---|---|---|---|
| | Fiber Furnish Composition | | | | | | | | Resin |
| | % PET Microfiber | % Fibrillated | % Wood Pulp | | | | | % Wet Strength | Overall % Phenolic Resin |
| Hand Sheets | Eastman PET Microfiber | Lyocell L010 | Sodra Red | Alabama Pine | HPZIII | Grand Prairie | Fibria | Additive Kymene | Momentive 161A |
| | 69 | 11 | | 20 | | | | 0.0 | 16.0 |
| | 69 | 12 | 19 | | | | | 0.0 | 16.0 |
| | 67 | 16 | | | 17 | | | 0.0 | 16.0 |
| 1 | 89 | 11 | | | | 0 | | 0.3 | 15.6 |
| 3 | 84 | 11 | | | | 5 | | 0.3 | 15.8 |
| 5 | 79 | 11 | | | | 10 | | 0.3 | 16.6 |
| 7 | 74 | 11 | | | | 15 | | 0.3 | 16.0 |
| 9 | 69 | 11 | | | | 20 | | 0.3 | 16.6 |
| 11 | 64 | 11 | | | | 25 | | 0.3 | 16.3 |
| 13 | 84 | 11 | | | | | 5 | 0.3 | 16.0 |
| 15 | 79 | 11 | | | | | 10 | 0.3 | 16.7 |
| 17 | 74 | 11 | | | | | 15 | 0.3 | 16.7 |
| 19 | 69 | 11 | | | | | 20 | 0.3 | 16.9 |
| 21 | 64 | 11 | | | | | 25 | 0.3 | 16.9 |
| 23 | 84 | 11 | | | 5 | | | 0.3 | 18.1 |
| 25 | 79 | 11 | | | 10 | | | 0.3 | 16.9 |
| 27 | 74 | 11 | | | 15 | | | 0.3 | 16.9 |
| 29 | 69 | 11 | | | 20 | | | 0.3 | 18.9 |
| 31 | 64 | 11 | | | 25 | | | 0.3 | 17.2 |
| | 30 | 20 | | | | 50 | | 0.3 | 13.5 |
| | 30 | 5 | | | | 65 | | 0.3 | 16.1 |
| | 30 | 20 | | | | | 50 | 0.3 | 13.9 |
| | 30 | 10 | | | | | 60 | 0.3 | 15.8 |
| | 30 | 20 | | | 50 | | | 0.3 | 17.4 |

TABLE 3B

| | Physical Properties - Saturated, Dried, Cured | | | Multipass Performance | | Normalized Capacity: = |
|---|---|---|---|---|---|---|
| Hand Sheets | SDC Basis Weight [g/m2] | SDC Caliper [mils] | SDC Air Permeability [cfm] @ 125 Pa | Apparent Capacity [mg/in$^2$] | Overall Efficiency @ 4 microns [%] | Capacity/ Caliper [mg/inch2/ mils] |
| | 127 | 28.0 | 4.88 | 19.4 | 99.5 | 0.69 |
| | 124 | 33.0 | 5.69 | 17.8 | 99.5 | 0.54 |
| | 128 | 27.2 | 3.50 | 20.0 | 99.7 | 0.74 |
| 1 | 201 | 34.59 | 2.10 | 22.0 | 99.8 | 0.63 |
| 3 | 197 | 36.45 | 2.23 | 21.3 | 99.8 | 0.59 |
| 5 | 201 | 35.40 | 2.12 | 20.3 | 99.8 | 0.57 |
| 7 | 199 | 30.37 | 1.88 | 17.0 | 99.8 | 0.56 |
| 9 | 208 | 38.74 | 2.07 | 13.0 | 99.6 | 0.33 |
| 11 | 208 | 35.63 | 1.78 | 17.8 | 99.7 | 0.50 |
| 13 | 197 | 36.97 | 2.10 | 19.2 | 99.8 | 0.52 |
| 15 | 200 | 35.47 | 2.04 | 21.8 | 99.7 | 0.61 |
| 17 | 203 | 38.22 | 2.13 | 21.3 | 99.7 | 0.56 |
| 19 | 202 | 33.12 | 2.12 | 17.8 | 99.7 | 0.54 |
| 21 | 206 | 35.35 | 2.22 | 15.1 | 99.7 | 0.43 |
| 23 | 211 | 38.90 | 2.37 | 19.9 | 99.8 | 0.51 |
| 25 | 207 | 43.59 | 2.68 | 25.4 | 99.7 | 0.58 |
| 27 | 198 | 35.46 | 2.72 | 20.1 | 99.6 | 0.57 |
| 29 | 203 | 37.27 | 2.89 | 19.4 | 99.5 | 0.52 |
| 31 | 201 | 41.70 | 3.08 | 20.8 | 99.3 | 0.50 |
| | 189 | 27.30 | 1.03 | 13.0 | 100.0 | 0.48 |
| | 189 | 25.66 | 2.62 | 12.0 | 95.8 | 0.47 |
| | 190 | 34.30 | 1.57 | 16.8 | 100.0 | 0.49 |
| | 191 | 36.00 | 2.66 | 17.0 | 99.5 | 0.47 |
| | 197 | 43.50 | 2.66 | 21.3 | 99.9 | 0.49 |

The data above demonstrate that the addition of natural wood pulp to a blend of PET nanofibers and fibrillated lyocell deteriorates the capacity properties of the filtration media. At levels above about 20-25 wt. %, the wood pulp can cause the capacity/caliper ratio to decrease below 0.5 mg/in$^2$/mils and thus should be avoided.

Example 4

Example 1 was repeated with different amounts of fibrillated lyocell. The data appear in Table 4 below.

TABLE 4

| | Composition | | | Physical Properties - | | | Multipass | | Normalized |
| | Fiber Furnish | | | Resin | Saturated, Dried, Cured | | | Performance | | Capacity: = |
| Hand Sheets | % PET Microfiber 2.5 microns | % Fibrillated Lyocell L010 | % Wet Strength Additive Kymene | Overall % Phenolic Resin Momentive 161A | SDC Basis Weight [g/m2] | SDC Caliper [mils] | SDC Air Permeability [cfm] @ 125 Pa | Apparent Capacity [mg/in$^2$] [mg/inch2] | Overall Efficiency @ 4 microns [%] | Capacity/ Caliper [mg/inch2/ mils] |
|---|---|---|---|---|---|---|---|---|---|---|
| 1 | 100 | 0 | 0 | 19.85 | 57.76 | 8.5 | 8.40 | 21.1 | 95.3 | 2.49 |
| 2 | 98 | 2.5 | 0 | 17.91 | 54.04 | 7.7 | 7.69 | 18.2 | 96.9 | 2.36 |
| 3 | 95 | 5 | 0 | 16.62 | 51.95 | 8.06 | 7.03 | 16.9 | 97.7 | 2.10 |
| 4 | 90 | 10 | 0 | 17.89 | 56.57 | 7.5 | 5.40 | 18.4 | 98.8 | 2.46 |
| 5 | 85 | 15 | 0 | 15.7 | 54.04 | 6.7 | 4.12 | 14.8 | 99.6 | 2.21 |
| 6 | 80 | 20 | 0 | 17.77 | 56.12 | 8.0 | 4.12 | 14.3 | 99.7 | 1.79 |
| 7 | 100 | 0 | 0 | 18.08 | 110.31 | 16.0 | 4.28 | 23.7 | 97.8 | 1.49 |
| 8 | 98 | 2.5 | 0 | 17.62 | 108.97 | 15.8 | 4.40 | 23.1 | 98.7 | 1.46 |
| 9 | 95 | 5 | 0 | 17.66 | 109.56 | 16.3 | 3.89 | 22.8 | 98.9 | 1.40 |
| 10 | 90 | 10 | 0 | 17.28 | 108.52 | 15.3 | 3.58 | 21.9 | 99.4 | 1.44 |
| 11 | 85 | 15 | 0 | 17.33 | 109.11 | 17.7 | 2.83 | 21.1 | 99.7 | 1.19 |
| 12 | 80 | 20 | 0 | 16.32 | 107.63 | 16.7 | 2.13 | 20.2 | 99.9 | 1.21 |
| 13 | 100 | 0 | 0 | 19.67 | 161.22 | 30.6 | 3.40 | 25.8 | 98.4 | 0.84 |
| 14 | 98 | 2.5 | 0 | 18.67 | 158.68 | 24.10 | 3.10 | 22.5 | 99.1 | 0.93 |
| 15 | 95 | 5 | 0 | 17.56 | 158.54 | 26.75 | 2.90 | 26.4 | 99.5 | 0.99 |
| 16 | 90 | 10 | 0 | 15.86 | 160.47 | 22.80 | 2.20 | 17.1 | 99.9 | 0.75 |
| 17 | 85 | 15 | 0 | 17.53 | 166.43 | 24.70 | 1.84 | 19.2 | 99.9 | 0.78 |
| 18 | 80 | 20 | 0 | 17.85 | 167.62 | 27.90 | 1.65 | 21.3 | 100.0 | 0.77 |
| 19 | 100 | 0 | 0 | 18.14 | 218.23 | 40.00 | 3.13 | 25.9 | 98.8 | 0.65 |
| 20 | 98 | 2.5 | 0 | 17.56 | 221.21 | 38.68 | 2.57 | 24.0 | 99.5 | 0.62 |
| 21 | 95 | 5 | 0 | 16.72 | 219.87 | 36.10 | 2.30 | 18.3 | 99.7 | 0.51 |
| 22 | 90 | 10 | 0 | 16.8 | 217.04 | 38.40 | 1.78 | 21.9 | 99.9 | 0.57 |
| 23 | 85 | 15 | 0 | 15.49 | 212.42 | 34.30 | 1.45 | 17.1 | 99.9 | 0.50 |
| 24 | 80 | 20 | 0 | 16.84 | 218.38 | 32.70 | 1.28 | 17.9 | 99.9 | 0.55 |

The data in Table 4 above show that fibrillated lyocell staple fibers when added in a relatively small amount (e.g, about 2.5 wt. % or more) to PET microfibers increases the filtration efficiency of the media. This is further shown by the graph of FIG. 1. Specifically, FIG. 1 shows that at 2.5 wt. % fibrillated lyocell, increased filtration efficiencies across all basis weights of the filtration media ensue. Thus, for higher basis weight media, amounts of fibrillated lyocell less than 2.5 wt. % may be present in order to achieve filtration efficiency of about 98% or greater.

The data also show that, although the relative amounts of the PET nanofibers and fibrillated lyocell nanofibers can be varied, generally it is the fibrillated lyocell nanofibers that contribute to an increased efficiency, while the PET nanofibers contribute to an increased filtration capacity. With higher basis weight, the filtration media generally exhibits higher capacity due to increase in caliper, and the pore structure gets smaller and more compact due to more filtration depth. Therefore, using the very same two components, the fibrillated lyocell nanofiber content must be decreased with an increase in basis weight in order to maintain the same efficiency level (which in this case, means that capacity will increase). With different grades (that is, different CSF characteristics) of fibrillated lyocell nanofibers, the absolute amount of the fibers will vary greatly. For example, the data show that substantially double the amount of the EFTec™ L200 Lyocell nanofibers yields the same efficiency level as compared to the EFTec™ L010 Lyocell nanofibers. The data in general show that a minimum amount of about 2.5 wt. % EFTec™ L010 fibrillated Lyocell nanofibers would be required while a maximum of 50 wt. % EFTec™ L200 fibrillated Lyocell nanofibers was required to achieve acceptable efficiency performance characteristics.

Example 5

Experimental glassfree media of this invention were grooved with the following dimensions being achieved as reported in Table 5 below:

TABLE 5

| Dimensions [mils] | Commercial Glass Media | Experimental 7B | Experimental 13B |
|---|---|---|---|
| SD Overall Caliper | 38 | 38 | 39 |
| SD Groove Depth | 13 | 21 | 19 |
| SD Optical Caliper A | 28 | 19 | 20 |

The table above shows that while the actual "flat" caliper of the experimental media is much smaller than the "flat" caliper of the commercial glass media, the same overall grooved caliper could be achieved by imparting a much larger groove. This means additional three dimensional filtration area is created, resulting in additional filtration performance in a converted filter. It was also observed that other hand sheets embodying the present invention could be grooved without cracking at SD Groove Depths of up to 29 mils.

Examples 6-9

Example 1 was repeated using a media formed of the following components:
PET Microfibers: non-fibrillated PET staple microfibers having an average diameter of 2.5 microns, commercially available from Eastman Chemical Company,
Fibrillated Cellulose: Fibrillated cellulose nanofibers commercially available from International Paper (formerly owned by Weyerhaeuser NR Co) under the tradename Interlace™ having a CSF of ≤10 mL.
KYMENE™ wet strength additive: A wet strength additive consisting of 12-13% solids of an aqueous solution of a cationic amine polymer-epichlorohydrin adduct having specific gravity is 1.03, pH is 3.5-4.5 and the solution contains 12-13% solids commercially available from Solenis International, L.P.
MOMENTIVE 161a: EPON™ Resin 161, a multifunctional epoxidized phenolic novolac resin binder commercially available from Momentive Specialty Chemicals, Inc. and having a epoxide equivalent weight of 169-178 g/eq (ASTM D1652), a viscosity (25° C.) of 18,000-28,000 cP (ASTM D2196) and a density (25° C.) of 10.0 lb/gal.
MOMENTIVE PA-70: ASTRO® Celrez PA-70, a methylated melamine resin system commercially available from Momentive Specialty Chemicals Inc.

Acid may be added to keep the pH of the resin system below 5 (preferably below 4), which helps catalyze curing-amount and type of acid is not critical. For example, a suitable acid catalyst is PTSA (Para Toulene Sulfonic Acid) 65, containing 65% active ingredient, supplied by Brenntag.

The samples were produced using a conventional "wet-laid" paper making process as described previously. The media samples were subject to longitudinal machine-direction (MD) grooving using mated male/female rollers as also described previously. The following test methods were employed:

SD MD Gurley Stiffness: The machine-direction bending resistance of SD media was measured using Gurley Stiffness Tester 4171E from Thwing-Albert Instrument Company, according to TAPPI Standard T543 "Bending resistance of paper (Gurley-type tester)" (incorporated fully by reference herein). Test specimens were cut to a length of 3.5 in in the machine-direction and a width of 2 in. Test parameters: the test was conducted using a 25 g weight attached at a distance of 4 in from the pivot.

SD Mullen Burst: The bursting strength of SD media was measured using a Mullen tester, according to TAPPI Standard T403 om-02.

SD MD Tensile Strength: The machine-direction tensile strength of SD media was measured using QC-1000 Tensile tester from Thwing-Albert Instrument Company, according to TAPPI Standard T494 "Tensile properties of paper and paperboard (using constant rate of elongation apparatus)" (incorporated fully by reference herein). Test specimens were cut to a length of 8 in in the machine-direction and a width of 1 in. Test parameters: rate of separation of the jaws was controlled at 1 in/min.

The SD (saturated and dried, but not fully cured) properties of the media samples are reported below in Tables 6A-6C below.

TABLE 6A

| | Composition | | | | | |
|---|---|---|---|---|---|---|
| | Fiber Furnish | | | Overall % Phenolic and Melamine | | |
| Example | % PET Microfiber 2.5 microns | % Fibrillated cellulose | % Wet Strength Additive Kymene | Resin Momentive 161A Momentive PA-70 | Resin Ratio of Phenolic/ Melamine | Resin System pH |
| 6 | 75 | 25 | <1 | 12 | 2.1 | 4.0 |
| 7 | 80 | 20 | 0.4 | 13 | 2.2 | 3.5 |
| 8 | 75 | 25 | 0.5 | 12 | 2.2 | 4.6 |
| 9 | 80 | 20 | <1 | 12 | 2.1 | 4.0 |

TABLE 6B

| | Physical Properties Saturated, Dried | | | | | | | |
|---|---|---|---|---|---|---|---|---|
| Example | SD Basis Weight [g/m2] | SD Overall Caliper [mils] | SD Groove Depth [mils] | SD Air Permeability [cfm] @ 125 Pa | SD MD Gurley Stiffness [mg] | SD Mullen Burst [psi] | SD MD Tensile Strength [lbs/in] | Wet Mullen Ratio [%] |
| 6 | 159.5 | 34 | 14 | 1.8 | 3400 | 66 | 32.3 | 76 |
| 7 | 161.2 | 38 | 21 | 2.7 | 3725 | 61 | 34.7 | 96 |
| 8 | 158.1 | 43 | 27 | 2.4 | 4900 | 62.5 | 31.6 | 77 |
| 9 | 153.6 | 47 | 18 | 3.2 | 3417 | 44 | 20 | 79 |

TABLE 6C

| | Multipass Performance | | | | | |
|---|---|---|---|---|---|---|
| Example | Apparent Capacity [mg/in2] [mg/inch2] | Overall Efficiency @ 1.5 microns [%] | Overall Efficiency @ 2 microns [%] | Overall Efficiency @ 2.5 microns [%] | Overall Efficiency @ 4 microns [%] | Normalized Capacity: = Capacity/ Overall Caliper [mg/inch2/mils] |
| 6 | 48.1 | 84.5 | 90.7 | 94.5 | 99.5 | 1.42 |
| 7 | 39.4 | 80.7 | 87.4 | 92.2 | 99.2 | 1.03 |
| 8 | 44.1 | 91.0 | 95.7 | 97.6 | 99.7 | 1.02 |
| 9 | 36.8 | 54.9 | 76.2 | 87.1 | 98.3 | 0.78 |

Figure 4:
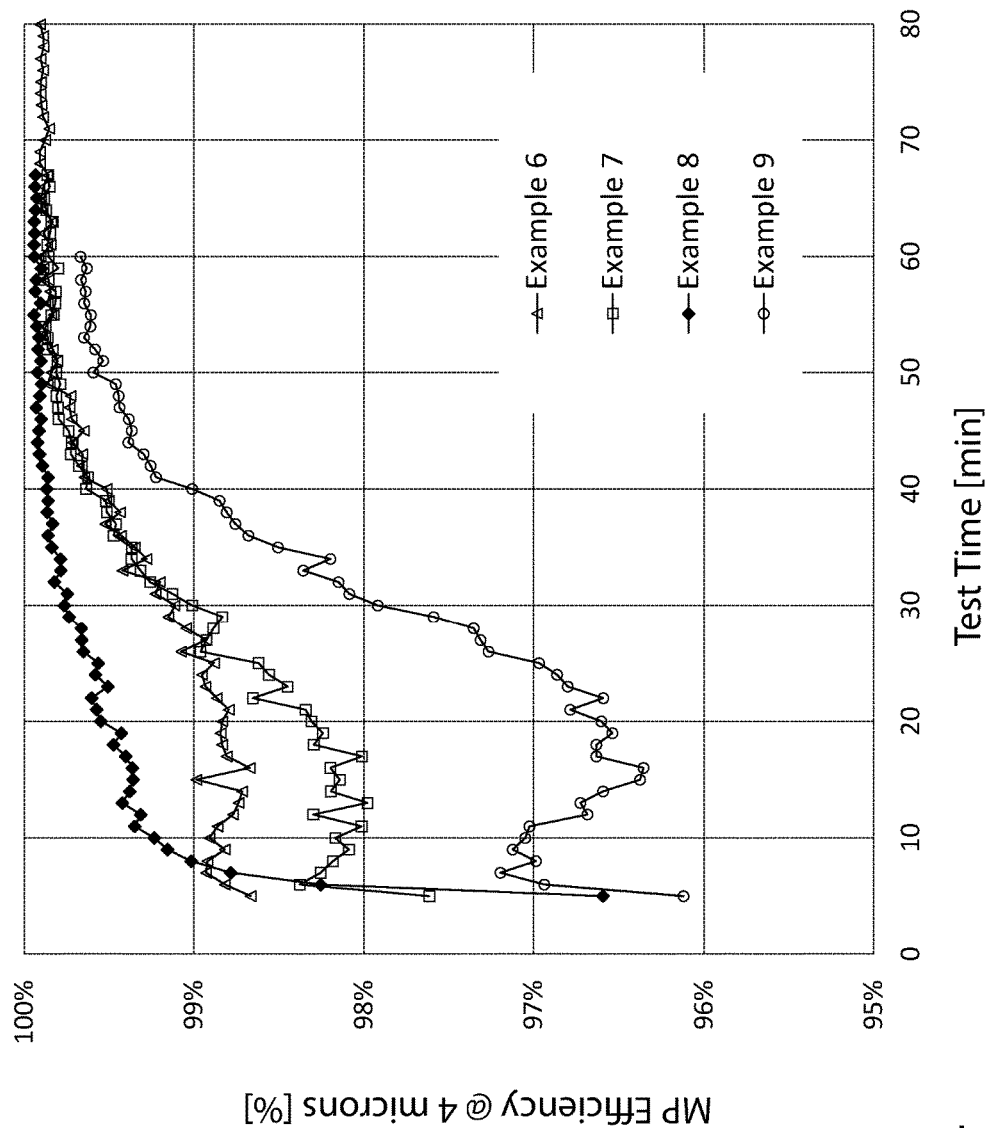
FIG. 4 is a plot of multipass (MP) efficiency (%) at 4 microns versus time (min.) for Examples 6-9 below.

Each of the filtration media samples of Examples 6-9 was subjected to multipass test according to ISO 19438:2003 using the same parameters as described in Example 1 above except that ISO medium test dust was used. The multipass test was conducted with a test stand manufactured by GMN provided with sensors that are capable of detecting particles as low as 1.5μ. The data for such multipass testing is presented in FIG. 4 as a function of test time. The first few minutes of test data are not included in the data plots. The downstream particle counts measured initially are considered to be unreliable as the test fluid (containing the dust) has not circulated completely through the fluid test loop. As can be seen from the data plots, the filtration media of Examples 6-9 were able to maintain filtration efficiency over a longer period of time (i.e., the filtration efficiency did not drop significantly over time during test, which is common in other cellulose-based filtration products).

* * *

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. High efficiency and high capacity filtration media comprising:
   a blend of synthetic non-fibrillated staple microfibers and fibrillated cellulosic staple fibers, wherein
   the synthetic non-fibrillated staple microfibers have an average fiber diameter of less than about 10 microns and an average fiber length of less than about 25 millimeters and are formed of a thermoplastic polymer selected from the group consisting of polyesters, polyalkylenes, polyacrylonitriles and polyamides, and wherein
   the fibrillated cellulosic fibers are present in the media in an amount to achieve a multipass dust holding capacity of 10 mg/in$^2$ and greater, and a multipass filtration efficiency at 1.5 microns of greater than 50%.

2. The filtration media of claim 1, wherein the synthetic non-fibrillated staple microfibers have an average fiber diameter of less than about 8 microns.

3. The filtration media of claim 1, wherein the synthetic non-fibrillated staple microfibers have an average fiber diameter of less than about 5 microns.

4. The filtration media of claim 1, wherein the synthetic non-fibrillated staple microfibers are polyethylene terephthalate microfibers.

5. The filtration media of claim 4, wherein the polyethylene terephthalate microfibers are the water-washed residue of water non-dispersible sulfopolyester fibers having a glass transition temperature (Tg) of at least 25° C., the sulfopolyester comprising (i) about 50 to about 96 mole % of one or more residues of isophthalic acid or terephthalic acid; (ii) about 4 to about 30 mole %, based on the total acid residues, of a residue of sodiosulfoisophthalic acid; (iii) one or more diol residues wherein at least 25 mole %, based on the total diol residues, is a poly(ethylene glycol) having a structure H—(OCH$_2$—CH$_2$)$_n$—OH, wherein n is an integer in the range of 2 to about 500; and (iv) 0 to about 20 mole %, based on the total repeating unites, of residues of a branching monomer having 3 or more hydroxyl, and/or carboxyl functional groups.

6. The filtration media of claim 1, wherein the synthetic non-fibrillated staple microfibers are present in an amount between about 50 wt. % to about 99.5 wt. % ODW.

7. The filtration media of claim 1, wherein the fibrillated cellulosic staple fibers comprise fibrillated lyocell nanofibers.

8. The filtration media of claim 7, wherein the fibrillated lyocell nanofibers are present in an amount of between about 0.5 to about 50 wt. % ODW.

9. The filtration media of claim 8, wherein the media has a basis weight of between about 15 gsm to about 300 gsm.

10. The filtration media of claim 1, wherein
    the synthetic staple fibers comprise polyethylene terephthalate microfibers which are present in an amount between about 50 wt. % to about 99.5 wt. % ODW, and wherein
    the fibrillated cellulosic staple fibers comprise fibrillated lyocell fibers having a Canadian Standard Freeness (CSF) of about 300 mL or less which are present in an amount of at least about 0.5 to about 50 wt. % ODW.

11. The filtration media of claim 1, wherein the fibrillated cellulosic fibers have an average diameter of about 1000 nanometers or less and an average length between about 1 mm to about 8 mm.

12. The filtration media of claim 1, further comprising natural wood pulp blended with the synthetic non-fibrillated staple fibers and fibrillated cellulosic staple fibers.

13. The filtration media of claim 12, wherein the natural wood pulp is present in an amount of about 25 wt. % ODW or less.

14. The filtration media of claim 13, wherein the natural wood pulp is present in an amount of about 20 wt. % ODW or less.

15. The filtration media of claim 1, further comprising a resin binder.

16. The filtration media of claim 15, having a SD machine direction stiffness according to TAPPI Standard T543 of greater than about 2.5 g.

17. The filtration media of claim 15, having a SD machine direction tensile strength according to TAPPI Standard T494 of greater than about 20 lb/in.

18. The filtration media of claim 15, having a SD dry burst strength according to TAPPI Standard T403 om-02 of greater than about 30 psi.

19. The filtration media of claim 15, wherein the resin binder is at least one selected from the group consisting of styrene acrylic, acrylic, polyethylene vinyl chloride, styrene butadiene rubber, polystyrene acrylate, polyacrylates, polyvinyl chloride, polynitriles, polyvinyl acetate, polyvinyl alcohol derivates, starch polymers, epoxy, phenolics and combinations thereof.

20. The filtration media of claim 15, wherein the resin binder is present in an amount of between about 2 to about 50 wt. % SDC.

21. The filtration media of claim 1, further comprising at least one additive selected from the group consisting of wet strength additives, optical brighteners, fiber retention agents, colorants, fuel-water separation aides, and flame or fire retardants.

22. The filtration media of claim 1, comprising longitudinally extending and latitudinally separated grooves.

23. The filtration media of claim 1, wherein the filtration media is pleated.

24. A multilayer filter comprising a first filtration layer comprised of the filtration media of claim 1, and at least one additional material layer.

25. The multilayer filter of claim 24, wherein the at least one additional material layer comprises a second filtration media layer that is laminated to the first filtration layer.

26. The multilayer filter of claim 24, wherein the at least one additional material layer comprises a supporting layer to support the first filtration layer.

27. The multilayer filter of claim 24, which is pleated and includes a wire mesh supporting layer co-pleated with the filtration media.

28. A filter unit comprising filtration media according to claim 1.

29. A method of making filtration media according to claim 1 comprising forming a wet laid sheet from a fibrous slurry comprised of the blend of synthetic non-fibrillated staple fibers and fibrillated cellulosic staple fibers, and drying the sheet to obtain the filtration media.

30. High efficiency and high capacity filtration media comprising a blend of:

synthetic non-fibrillated staple polyethylene terephthalate microfibers having an average fiber diameter of less than about 10 microns and an average fiber length of less than about 25 millimeters, and fibrillated cellulosic staple fibers, wherein the fibrillated cellulosic fibers are present in the media in an amount to achieve a multipass dust holding capacity of 10 mg/in$^2$ and greater, and a multipass filtration efficiency at 1.5 microns of greater than 50%, and wherein the polyethylene terephthalate microfibers are the water-washed residue of water non-dispersible sulfopolyester fibers having a glass transition temperature (Tg) of at least 25° C., the sulfopolyester comprising (i) about 50 to about 96 mole % of one or more residues of isophthalic acid or terephthalic acid; (ii) about 4 to about 30 mole %, based on the total acid residues, of a residue of sodiosulfoisophthalic acid; (iii) one or more diol residues wherein at least 25 mole %, based on the total diol residues, is a poly(ethylene glycol) having a structure H—(OCH$_2$—CH$_2$)$_n$—OH , wherein n is an integer in the range of 2 to about 500; and (iv) 0 to about 20 mole %, based on the total repeating unites, of residues of a branching monomer having 3 or more hydroxyl, and/or carboxyl functional groups.

* * * * *